(12) United States Patent
Juang et al.

(10) Patent No.: US 8,645,384 B1
(45) Date of Patent: Feb. 4, 2014

(54) UPDATING TAXONOMY BASED ON WEBPAGE

(75) Inventors: Philo Juang, Poquoson, VA (US);
Christopher Testa, Venice, CA (US);
Nicolaus Mote, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 395 days.

(21) Appl. No.: 12/774,448

(22) Filed: May 5, 2010

(51) Int. Cl.
*G06F 7/00* (2006.01)
*G06F 17/30* (2006.01)

(52) U.S. Cl.
USPC ............ 707/738; 707/791; 707/802; 707/829

(58) Field of Classification Search
USPC .......................................................... 707/738
See application file for complete search history.

(56) References Cited

U.S. PATENT DOCUMENTS

| | | | |
|---|---|---|---|
| 6,961,731 B2 | 11/2005 | Holbrook | |
| 7,047,236 B2* | 5/2006 | Conroy et al. | 1/1 |
| 7,464,122 B1* | 12/2008 | Basko et al. | 1/1 |
| 7,668,850 B1* | 2/2010 | Bierner | 707/694 |
| 7,865,397 B2* | 1/2011 | Makeev et al. | 705/14.71 |
| 8,086,622 B2* | 12/2011 | Bennett | 707/766 |
| 2004/0139059 A1* | 7/2004 | Conroy et al. | 707/3 |
| 2004/0139259 A1* | 7/2004 | Mantey et al. | 710/113 |
| 2005/0120006 A1* | 6/2005 | Nye | 707/3 |
| 2008/0059486 A1* | 3/2008 | Pappas | 707/100 |
| 2008/0195674 A1* | 8/2008 | Kim et al. | 707/203 |
| 2008/0263461 A1* | 10/2008 | Robb et al. | 715/760 |
| 2009/0063538 A1* | 3/2009 | Chitrapura et al. | 707/102 |
| 2009/0327338 A1* | 12/2009 | Zhao et al. | 707/103 R |
| 2010/0064258 A1* | 3/2010 | Gorczowski et al. | 715/841 |
| 2010/0082590 A1* | 4/2010 | Nye | 707/706 |
| 2010/0313149 A1* | 12/2010 | Zhang et al. | 715/760 |
| 2011/0213655 A1* | 9/2011 | Henkin et al. | 705/14.49 |

OTHER PUBLICATIONS

Arul Prakash Asirvatham et.al., "Web Page Categorization based on Document Structure".*
Xiaoguang Qi et.al., "Web Page Classification: Features and Algorithms", Jun. 2007.*
Dou Shen et.al., "Web-page Classification through Summarization", 2004.*
Xiaogang Peng et.al., "Automatic Web Page Classification in a Dynamic and Hierarchical Way", 2002.*
Arul Prakash Asirvatham et.al., "Web Page Categorization based on Document Structure", Oct. 21, 2001.*

* cited by examiner

*Primary Examiner* — Binh V Ho
(74) *Attorney, Agent, or Firm* — Brake Hughes Bellermann LLP

(57) ABSTRACT

According to an example implementation, a computer-implemented method may include extracting, by a computing device, structured content from a website, determining a recent taxonomy by applying category rules to the structured content, the recent taxonomy including multiple categories and a new category, and updating a stored taxonomy based on the determined recent taxonomy by adding the new category to the stored taxonomy.

26 Claims, 8 Drawing Sheets

UPDATING TAXONOMY BASED ON WEBPAGE

TECHNICAL FIELD

This description relates to taxonomic classification.

BACKGROUND

It is often a difficult task for computing systems to receive a document or other content and to determine a meaning or other content of the document. For example, while it may be straightforward to determine individual words within the document, it is often difficult to determine (with a given degree of certainty) a context of a given word, or relationships between words which impart meaning to the document as a whole. For example, it may be straightforward for a computing system to determine that a document contains the word "bank." However, it may be more problematic for the computing system to determine whether the word "bank" in the document refers to, e.g., a financial institution, a bank of a river, or a turning of an airplane; all of which may be referred to using the term bank (or variations thereof).

Nonetheless, it is known that such information about the meaning or content of a document may potentially be very useful with respect to use of the document. For example, advertisers may wish to know about the content of a document, so as to more accurately and more meaningfully place their advertisements within content-related documents. For example, a financial institution may wish to place an advertisement within a document using the word bank in the context of finance, but not within one of the other contexts just referenced above. Consequently, computing systems and applications have been developed for determining a content, context, or meaning of documents, e.g., for the purpose of providing advertisements within such documents, or otherwise benefitting from knowledge about the content or meaning thereof.

One such technique may be referred to as taxonomic classification. In taxonomic classification, a taxonomy related to a particular topic or context is developed which includes a plurality of hierarchical categories, e.g., in a tree structure. For example, a taxonomy related to automobiles may include a first level categorizing automobiles as used or new. A level lower in the hierarchy of categories may distinguish each of the above categories as foreign or domestic cars, and lower levels may continue to branch into further defining characteristics of cars, including, e.g., a make, model, price or other feature of cars that may be associated with the taxonomy.

Then, in taxonomic classification, a generally large set of known documents may be considered, parsed, or otherwise analyzed to apply the hierarchical categories (and/or other features of the taxonomy) as labels to individual documents (or portions thereof) from a set of documents. For example, a number of human readers may be employed to read each of the individual documents within the set of known documents, and to apply categories or other features of the taxonomy as labels to individual elements of the document. For example, a human user may read a document and identify the word "civic" and may, if appropriate, associate the word "civic" with a model of the automobile Honda Civic, where, as just referenced, such an automobile model may be a category within the hierarchy of categories of the associated automobile taxonomy. Consequently, the so-labeled document may be categorized or labeled with respect to the automobile taxonomy, and not with reference to, for example, a civic duty of a citizen, or other meaning.

When all of the documents of the known set of documents have been appropriately labeled as just described, then the resulting set of labeled documents may be referred to or known as a "golden set," or a "training set." Known techniques exist for analyzing such a training set to determine a classifier model. Such a classifier model, in general, represents rules or other criteria which are derived from the labeled documents. For example, such a classifier model may include a set of rules which, for each labeled word or term, considers other factors, such as a proximity of the labeled word to other words within the document, and assigns a probability of the word in the particular context as having one or more meanings within that context. Then, a taxonomic classifier may be used to receive or otherwise determine a new document which is not a part of the set of labeled or categorized documents, and to implement the classifier model in conjunction with the original taxonomy in order to classify the newly-received documents with respect to the taxonomy. Once that classification has occurred, the taxonomy classifier may be further configured to attach, insert or otherwise provide supplemental content which is thought to be related to the newly-received and now-classified document.

Although such techniques have proven very useful in classifying newly-received documents which would otherwise be difficult to classify with respect to the taxonomy, the use of, and need for, human users to read the original set of documents and assign labels to portions thereof to create the training set, as just described, represents a significant bottleneck in the classification process, and adds a large amount of delay and expense to the process as a whole. For example, it may take users days or longer to read each of the documents within the original/known set of documents, and each of the users may be compensated for his or her efforts. Further, whenever some element of the taxonomy or the set of documents changes, then the process must be repeated in whole or in part, which, again, may add significant delay and expense to the classification process as a whole. In particular, such changes may need to occur rapidly in order to keep up with changing content of the documents (e.g., when a new and very popular product or concept appears within the documents). Consequently, it may be problematic to implement taxonomic classification in an effective manner, and in a manner which is fast, inexpensive, and easily-updatable.

SUMMARY

According to one example implementation, a computer-implemented method may comprising extracting, by a computing device, structured content from a website, determining a recent taxonomy by applying category rules to the structured content, the recent taxonomy including multiple categories and a new category, and updating a stored taxonomy based on the determined recent taxonomy by adding the new category to the stored taxonomy.

According to another example implementation, a computer-readable medium may include executable code tangibly embodied thereon. The executable code may be configured to, when executed, cause a data processing apparatus to extract structured content from a website, determine a recent taxonomy by applying category rules to the structured content, the recent taxonomy including multiple categories and a new category, and update a stored taxonomy based on the determined recent taxonomy by adding the new category to the stored taxonomy.

According to another example implementation, an apparatus may comprise at least one processor and at least one memory device. The at least one memory device may comprise executable code stored thereon that, when executed by the at least one processor, is configured to cause the apparatus to extract structured content from a website, determine a recent taxonomy by applying category rules to the structured content, the recent taxonomy including multiple categories and a new category, and update a stored taxonomy based on the determined recent taxonomy by adding the new category to the stored taxonomy.

The details of one or more implementations are set forth in the accompa-nying drawings and the description below. Other features will be apparent from the description and drawings, and from the claims.

DETAILED DESCRIPTION

Figure 1:
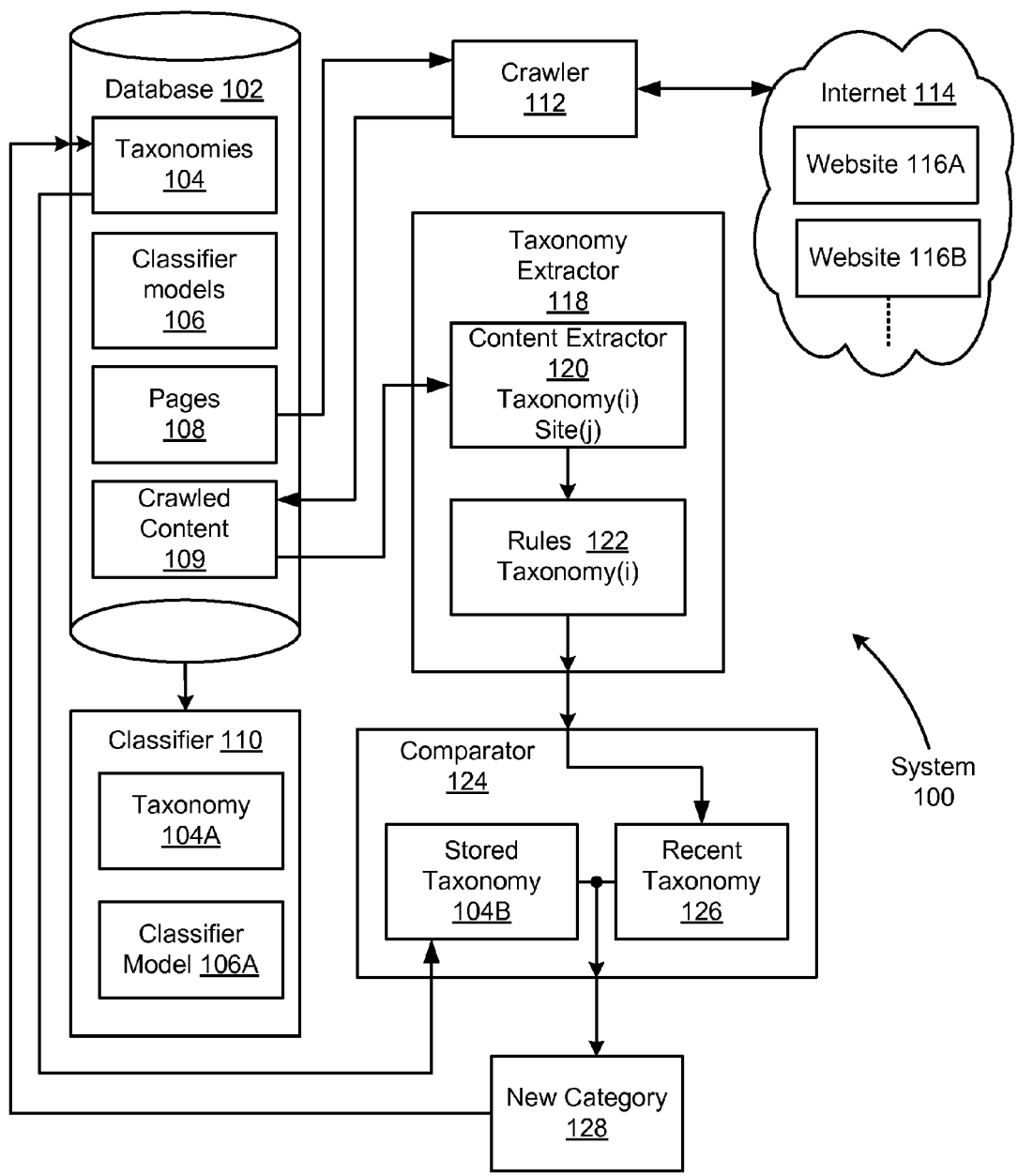
FIG. 1 is an exemplary block diagram of a system for updating taxonomies according to an example implementation.

FIG. 1 is an exemplary block diagram of a system 100 for updating taxonomies according to an example implementation. The system 100 may be included in a server, a mainframe, a personal computer, a laptop or any other computing device, according to example implementations. The system 100 may, for example, update taxonomies based on structured content on websites or webpages. In one exemplary implementation, the system 100 may update taxonomies based on structured content such as, for example, structured hyper text markup language (HTML) content, extensible markup language (XML) content, XHTML content, and other types of structured content including combinations of different types of structured content. The system 100 may, for example, extract the structured content from the website or webpage.

The system 100 may determine a recent taxonomy by applying categorical rules to the structured content. The recent taxonomy may, for example, include multiple categories, such as at least a first category, a second category, and a third category. The system 100 also may update a stored taxonomy based on the determined taxonomy by adding the third (new) category to the stored taxonomy. In an example implementation, the stored taxonomy may have included the first category and the second category but not the third or new category before the updating. The stored taxonomy may include the third or new taxonomy only after the updating according to an example implementation.

In an example implementation, the system 100 may include inputs and outputs. The inputs may include, for example, a keyboard, a mouse, disk drives and network ports. The system 100 also may include outputs. The outputs may include, for example, a monitor, a printer, other displays as well as ports to networks. The system 100 may be connected to one or more networks such as the Internet, a local area network (LAN), a wide area network (WAN) or other networks according to example implementations. The system 100 may include a processor (not shown) for executing instructions as well as memory which stores instructions and/or data, according to an example implementation. The processor may be operably coupled to one or more of the other components illustrated in FIG. 1 and may execute instructions that cause one or more of the other components to perform actions.

The system 100 may include a database 102. The database 102 may include any form of volatile or non-volatile memory such as a hard disk, magnetic memory, optical disks, random access memory (RAM), dynamic random access memory (DRAM), flash memory, erasable programmable read-only memory (EPROM), electrically erasable programmable read-only memory (EEPROM), or other forms of memory. The database 102 may be coupled to the processor. The database 102 may include multiple taxonomies 104. The taxonomies 104 may store relationships between categories, as well as categories themselves.

Figure 2:
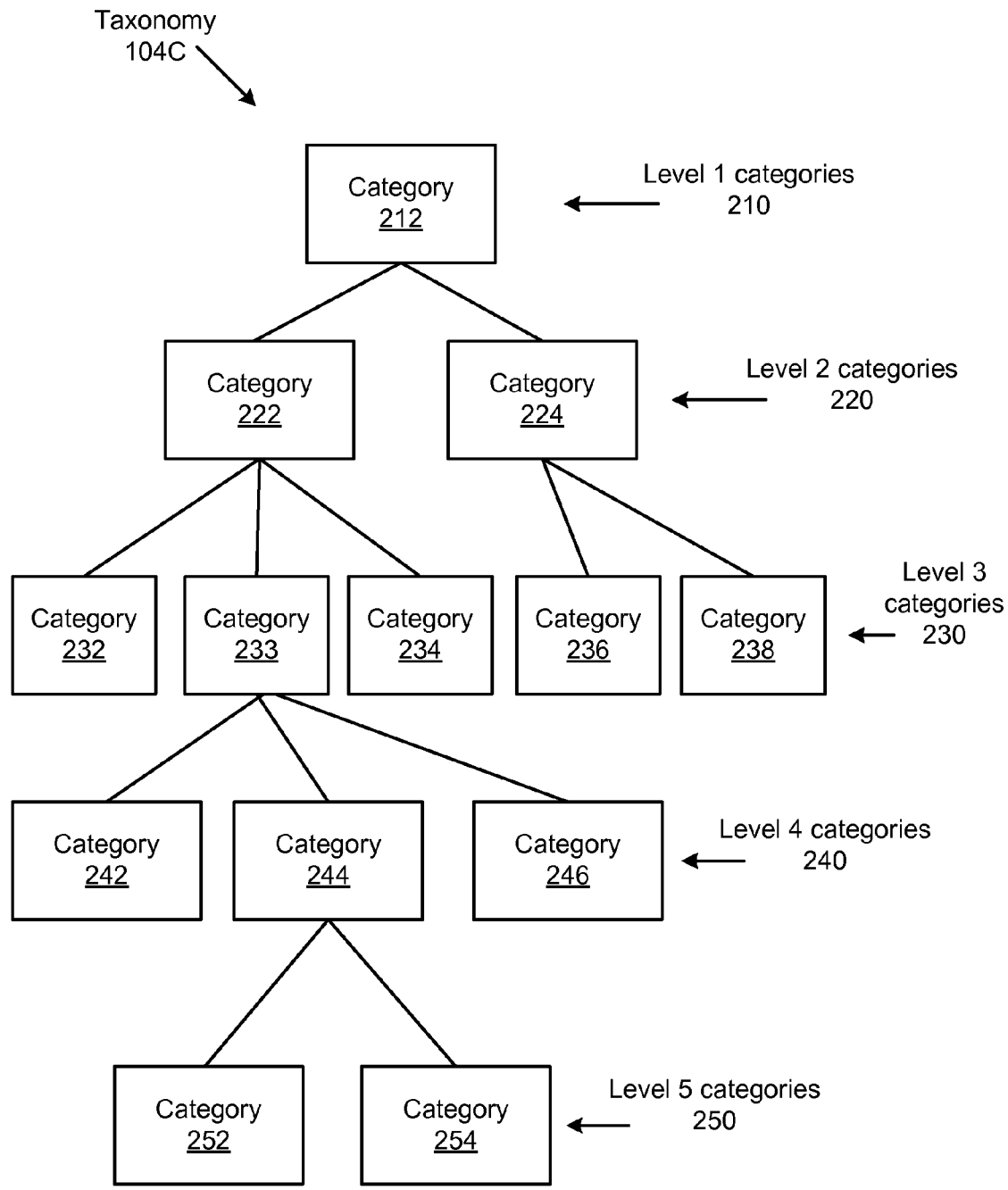
FIG. 2 is an exemplary block diagram of a template for taxonomies according to an example implementation.

Referring also to FIG. 2, an exemplary block diagram of a template for taxonomies, according to an example implementation, is illustrated. A taxonomy, such as the taxonomy 104C shown in FIG. 2, may include multiple levels of categories or classifications as well as multiple categories or classifications. In the example shown in FIG. 2, the taxonomy 104C may include level one categories 210, level two categories 220, level three categories 230, level four categories 240 and level five categories 250.

In the example shown in FIG. 2, the taxonomy 104C includes one category 212 which is included in the level one categories 210. The category 212 may include any of a number of categories or classifications such as electronic devices or automobiles, as non-limiting examples.

In the example shown in FIG. 2, categories may be super-categories or subcategories of other categories. For example, in the level two categories 220, category 222 and category 224, may be subcategories of the category 212 (which is a level one category 210). Similarly, the category 212 may be a super-category of both categories 222 and category 224. In the example shown in FIG. 2, category 222 may have three subcategories: category 232, category 233, and category 234. Similarly, in this example, category 224 may have two subcategories; category 236 and category 238. In this example, all of the categories 232, 233, 234, 236, 238 are level three categories 230.

The example shown in FIG. 2 shows three subcategories for category 233. The subcategories for category 233 are level four categories 240, namely, category 242, category 244, and category 246. Also in this example, category 244 has two subcategories, category 252 and category 254. In this example, category 252 and category 254 are both level five categories 250.

In this example, category 244 is a super-category of both categories 252 and category 254. Category 233 is a super-category of category 242, category 244, and category 246. Category 222 is a super-category of category 232, category 233, and category 234.

The taxonomy 104C shown in FIG. 2 is merely an example. Many more categories could be shown in other taxonomies and other relationships between the categories could be shown in other taxonomies as well. Also, the hierarchy between categories within the taxonomy could be changed. In an example of an automobile taxonomy, the category levels, in descending order, could include year, manufacturer, and model, or could instead include, in descending order, manufacturer, model, and year, as non-limiting examples.

Returning to FIG. 1, the taxonomies 104, which are included in the database 102, may include a plurality of taxonomies, such as the example taxonomy 104C, as shown in FIG. 2. The taxonomies 104 may relate to a variety of consumer products, services, and other types of information that person may wish to search for, organize, and/or classify.

The database 102 also may include multiple classifier models 106. The classifier models 106 may include examples of the categories shown in FIG. 2. The classifier model 106 may, for example, include webpages, files, or content on webpages which correspond to categories or classifications within any given taxonomy, such as the example taxonomy 104C, as shown in FIG. 2. The classifier model 106 also may include features of files, sentences, or words which correspond to categories or classifications within a given taxonomy. The classifier model 106 may have been generated at least in part by humans. For example, humans may have looked at multiple webpages or data and classified them into categories within a given taxonomy. The classification decisions by the humans may be used as examples to classify other data or webpages of unknown classification, such as by the system 100 and/or by the classifier comparing the other data or webpages to the classified examples.

The database 102 also may include a list or index of pages 108 to visit or crawl. The pages 108 may be webpages, uniform resource locators (URLs), or websites which are used to update the taxonomy 104. The pages 108 may be visited or crawled as part of the updating, and/or as part of an indexing of webpages to assist in searching for relevant webpages. The updating using the webpages, websites, and/or URLs to update the taxonomy 104 will be described below.

The system 100 also may include a classifier 110. A classifier 110 may utilize the taxonomy 104 and the classifier model 106 from the database 102 to classify content such as, for example, webpages, data, and/or HTML content. The classifier 110 may, for example, classify webpages, data, and/or HTML content into one of the categories in a given taxonomy. The classifier 110 may, for example, retrieve a particular taxonomy 104A from the taxonomies 104 included in the database 102. The classifier 110 may also retrieve a particular classifier model 106A from the classifier model 106 included in the database 102; the retrieved classifier model 106A may be associated with the retrieved taxonomy 104A.

The classifier 110 may classify a webpage, data, or other HTML content into a category in the taxonomy 104A based on the examples in the classifier model 106A. For example, the classifier 110 may compare a webpage, data, or HTML content to examples in the classifier model 106A using comparison models, similarity models, or clustering models according to example implementations. These examples are non-limiting and other classification techniques may be used. The classifier 110 may associate and/or assign the classified webpage, data, or HTML content into a category within the taxonomy 104A based on the comparison.

The system 100 also may include a crawler 112. The crawler 112 may crawl websites and/or webpages to extract and/or to retrieve their content. The crawler 112 may, for example, crawl sites or pages which are identified or listed in the database 102, such as those included in the pages 108. The crawler 112 may, for example, access the Internet 114. The crawler 112 may go to websites, webpages, and/or URLs based on the pages 108 included in the database 102. The crawler 112 may, for example, go to multiple websites or webpages such as the example websites 116A and 116B included in the Internet 114. The crawler 112 may, for example, crawl multiple websites 116A, 116B for a given taxonomy 104.

The crawling performed by the crawler 112 may be part of the taxonomy updating process, and/or may be part of an indexing of webpages to assist with generating relevant search results. The crawler 112 may periodically crawl websites or webpages for a given taxonomy, such as daily, weekly, monthly, yearly, or according to any other schedule, according to example implementations. In an example implementation, the frequency of the system 100 crawling a given website or webpage may change depending on how frequently the content of the website or webpage changes. The crawler 112 may also be triggered or launched on demand to crawl websites 116A, 116B when requested by an administrator, according to an example implementation.

Crawl operations may involve, for example, beginning with a website 116A (which may be a top-level site), and then selecting (in series or in parallel) some or all of the links (e.g., hyperlinks) therein. Crawling proceeds with collecting information/data about each crawled site (e.g., using a URL or other information), and then with further following of links contained within the linked sites. The crawling process may continue until a linked site is reached which contains no more links, or until some number (level) of linked sites have been crawled, or until some other criteria is met for ceasing the crawling operation(s).

The information obtained by the crawler 112 during the above-described process may then be stored within extracted or crawled content 109 in the database 102. Thus, it may be appreciated that the extracted or crawled content 109 represents all of the obtained information, such as, for example, all of the various webpages, sites, or other documents obtained by the crawler 112, as well as information about where and how each such document was obtained. For example, in the system of FIG. 1, it may be assumed that the various sites 116A, 116B are sites on the public Internet 114. In this case, the extracted or crawled content may include each of the relevant documents, along with a URL identifying the location of the corresponding document on the public Internet. Of course, this is merely an example, and the sites 116A, 116B may in fact be located and crawled in other contexts. For example, such sites may be available on a private network, or on a corporate intranet, or may otherwise be available for crawling by the crawler 112.

The database 102 may associate multiple pages 108 with a given taxonomy 104. In an example implementation, a programmer may have associated multiple pages 108 with a given taxonomy 104 for the purpose of updating the taxonomy 104. For example, if the programmer wishes to be able to update a taxonomy for electronic devices, the programmer may associate multiple websites, such as an Apple website, a Sony website, and/or a Philips website, as non-limiting examples, with the taxonomy for electronic devices. Similarly, a programmer who wishes to be able to update a website for automobile models may associate websites such as, for example, edmunds.com, and/or other car review websites with the taxonomy for automobiles. The crawler 112 may then crawl those websites which the programmer has associated with a given taxonomy.

For each of the crawled websites 116A and/or 116B, the content retrieved from the website 116A and/or 116B and stored in the crawled content 109 may be provided to a taxonomy extractor 118, according to an example implementation. According to another example implementation, the crawler 112 may provide the crawled content directly to the taxonomy extractor 118. The taxonomy extractor 118 may infer categories from the crawled content 109, such as by applying category rules to the content. The category rules may be rules which the taxonomy extractor 118 uses to determine a taxonomy or updated taxonomy based on the crawled content 109. The category rules may include, for example, inferring categories, subcategories, or supercategories based on the structure of the crawled content 109. For example, the category rules may determine that items associated with hyperlinks within an area of a webpage, objects within a div, items within a menu or drop-down menu, items within a same row or column of a table, items included in a section of a list or outline, and/or options within a webpage may be categories within a same supercategory, as non-limiting examples. The category rules may also determine that options or categories which become available after a selection has been made, such as after an item has been selected from a menu or drop-down menu, or after a hyperlink has been clicked, are subcategories of the selected option, according to example implementations. The category rules may be customized based on a stored taxonomy 104, and/or based on a stored version of a website 116A, 116B or webpage. For example, if it is known that subcategories of a known category are included within an area of a webpage, div, menu, drop-down menu, table, list, or outline, then the category rules may determine that all items, objects, or options within the webpage, div, menu, drop-down menu, table, list, or outline or subcategories of the known category; if a new item, object, or option is found in the crawled content, then the category rules may dictate that the new item, object, or option should be used to add a new subcategory to the taxonomy 104. The category rules may also determine categories based on significant keywords included in the crawled content 109; significant keywords may be considered "significant" based, for example on inverse document frequency or other techniques for extracting significant or relevant text, according to example implementations. The taxonomy extractor 118 may extract structured content from the website such as, for example, structured hyper text markup language (HTML) data and/or code from the website. The structured content is not limited to HTML data and may include other types of code including, for example, XML data, XHTML data, csv files, pdf files, or online spreadsheets, according to example implementations.

In one exemplary implementation, the taxonomy extractor 118 may extract only information and/or content which is relevant to updating taxonomies based on rules provided by the programmer, based on the taxonomy 104A and classifier model 106A for the taxonomy 104A for which the crawl and extraction are being performed, and/or based on machine learning algorithms which determine relevance of content to the taxonomy 104A. The taxonomy extractor 118 may be programmed to extract categories from a specified webpage based on a specified format of the webpage. In an example implementation, if the system 100 determines that the format of a webpage has changed, then the system may notify a programmer or administrator of the changed format, such as by sending the programmer or administrator an email. The taxonomy extractor 118 may, for example, ignore certain aspects such as fonts, color, and/or sizes of text, which may not be relevant in determining a taxonomy. The taxonomy extractor 118 may, for example, determine that data or content on a webpage does not fit into the current taxonomy 104A, and may, based on determining that the data or content does not fit into the current taxonomy 104A, determine that a new category or classification should be created to accommodate the data or content.

The taxonomy extractor 118 may determine a recent taxonomy based on structured content from the websites 116A and 116B, which is relevant to a taxonomy 104. The relevance may be embodied in rules specific to the websites 116A and 116B or to the taxonomy 104. For example, the taxonomy extractor 118 may apply the category rules to look for objects, divs, menus, tables with table entries, or certain textual patterns such as indentations and line changes, which the programmer may have instructed the taxonomy extractor 118 to review for categories or classifications. The taxonomy extractor 118 may, for example, be programmed and/or customized to determine categories based on hyperlinks within a webpage, objects or divs, menus or drop-down menus, tables, lists, and/or categories or options included on the webpage; this programming and/or customization may be in accordance with, or the result of, the category rules, according to example implementations. The taxonomy extractor 118 also may select significant keywords from the website and ignore less relevant words from the website. The taxonomy extractor 118 may, for example, select significant keywords based on inverse document frequency or other such techniques to extract significant keywords.

The taxonomy extractor 118 may be customized for each taxonomy 104 and/or each of the websites 116A and 116B in accordance with, or as a result of, the category rules, according to example implementations. For example, a taxonomy extractor 118 may be designed generically, and may have subclasses or inherited taxonomy extractors for each taxonomy 104. Similarly, the taxonomy extractor 118 for each taxonomy may have sub-taxonomy extractors or inherited classes for each website 116A and/or 116B which is associated with the taxonomy 104, in accordance with, or as a result of, the category rules. Thus, the programmer may customize the taxonomy extractor 118 for each given taxonomy and may further customize the taxonomy extractor 118 (which has been customized for the given taxonomy) for each site or page. The taxonomy extractor 118 may, for example, determine the taxonomy based on the structured content of a webpage (e.g., structured HTML content) included in the crawled website 116A and/or 116B, such as based on HTML tags, menus, significant keywords, locations of words, or terms, tables and table entries, and/or divs, according to example implementations. The type(s) of structured content, from which the taxonomy extractor 118 may determine the taxonomy, may be customized for each webpage, in accordance with or as a result of the category rules, according to an example implementation.

The taxonomy extractor 118 may include a content extractor 120. The content extractor 120 may extract the relevant content from the content provided by the crawled content 109. As discussed above, the taxonomy extractor 118 may be customized for each taxonomy and/or for each site or page; the content extractor 120 also may be customized for each taxonomy and/or for each site or page. In an example implementation, the content extractor 120 may operate for each taxonomy such as, for example, a taxonomy from zero or one to i, i being the number of taxonomies 104 stored in the database 102, and for each taxonomy, may operate on each site, from zero or one to j for example, j being the number of sites 108 associated with the taxonomy i. The content extractor 120 may have been customized by a programmer for each website 116A and/or 116B or webpage to be crawled, according to an example implementation.

The taxonomy extractor 118 also may include rules 122. The rules 122 may determine a recent taxonomy 126 based on the relevant content extracted by the content extractor 120. The rules 122 may be customized for each taxonomy 104. For example, the rules 122 may be written generically for all taxonomies, and sub-rules may be written for each given taxonomy. The rules 122 may, therefore, operate for each taxonomy zero or one through j. The rules 122 may utilize the relevant content extracted by the content extractor 120 to determine the new taxonomy. The rules 122 may be based in part on previously known features of the taxonomy, and may allow the taxonomy to be updated within the framework of the previously stored taxonomy 104. While certain features and functions of the content extractor 120 and the rules 122 have been described herein, features described with reference to the content extractor 120 may be included in the rules 122, and features described with reference to the rules 122 may be included in the content extractor 120.

Based on the content provided to the taxonomy extractor 118 by the crawled content 109, the taxonomy extractor 118 may determine the recent taxonomy 126 using the content extractor 120 and the rules 122. The determined recent taxonomy 126 may include categories in hierarchical relationships to each other, such as the categories included in the taxonomy 104C shown in FIG. 2. The taxonomy extractor 118 may provide the recent taxonomy 126 to a comparator 124.

The comparator 124 may retrieve a stored taxonomy 104B from the taxonomies 104 included in the database 102. The stored taxonomy 104B may include the categories, and their hierarchical relationships, of the taxonomy to be updated, as stored before the operations described with reference to the crawler 112, crawled content 109, and taxonomy extractor 118 were performed; the taxonomy 104C shown in FIG. 2 may be an example of the stored taxonomy 104B retrieved by the comparator 124 from the database 102. The comparator 124 may compare the stored taxonomy 104B to the recent taxonomy 126. If the recent taxonomy 126 includes one or more categories which are not included in the stored taxonomy 104B, the comparator 124 may determine that this category(ies) is a new category 128.

In an example implementation, the system 100 may add a file and/or webpage associated with the new category 128 to the classifier model 106A associated with the taxonomy 104C for the new category 128. For example, if the system 100 added the new category 128 based on a hyperlink, the system 100 may add the linked page (or content included therein) to the classifier model 106 as an example of the new category. Or, if the system 100 added the new category 128 based on a graphics object associated with text labeling the new category 128, the system 100 may add the graphics object as an example of the new category 128. In an example implementation, the extracting the structured content (and/or crawled content 109) from the website(s) 116A, 116B by the crawler 112, determining the recent taxonomy by the taxonomy extractor 118 and/or comparing the recent taxonomy 126 to the stored taxonomy 140B by the comparator 124 be performed automatically by the system 100 and without human intervention. This automatic performance by the system 100 may save human labor. The system 100 may also update the taxonomy 104 based on the new category 128. The updating the taxonomy 104 may include, for example, adding the new category 128 to the taxonomy 104. The system 100 may, for example, update the taxonomy 104 by adding the new category 128 to any of the levels of categories 210, 220, 230, 240, 250 shown in FIG. 2 depending on what level the category rules determined the new category 128 to have been included in. The system 100 may update the taxonomy 104 based on the new category 128 automatically, without human intervention, or may present the new category 128 to a human administrator for approval. The system 100 may present the new category 128 to the human administrator automatically, and wait for a response from the human administrator, according to an example implementation.

In example implementations, the system 100 may include the new category 128 in the taxonomy 104C and/or provide the new category 128 to the administrator for approval based on the system 100 finding the new category 128 on a single webpage, or may include the new category 128 in the taxonomy 104C only after finding the new category 128 on at least two (or other threshold number of) webpages on distinct websites. Updating the taxonomy 104C based on a single website or webpage may allow the taxonomy 104C and the taxonomies 104 included in the database 102 to be updated more quickly, but may lead to errors if a single website or webpage includes a new category. Updating the taxonomy 104C and the taxonomies 104 included in the database 102 only after multiple websites and/or a threshold number of websites have shown the new category 128 may be more reliable but may also introduce greater delay in updating the taxonomies. For example, if a single website or webpage shows a new product, but reviewing websites are not yet reflecting the new product, the system 100 may be slow to update the taxonomies 104. The system 100 may also classify certain websites as "trusted" websites, and update the taxonomy 104C based on the single trusted website showing the new category 128, and update the taxonomy 104C based on websites which are not "trusted" only after finding the new category on at least two (or other threshold number of) "non-trusted" websites, according to an example implementation.

Figure 3:
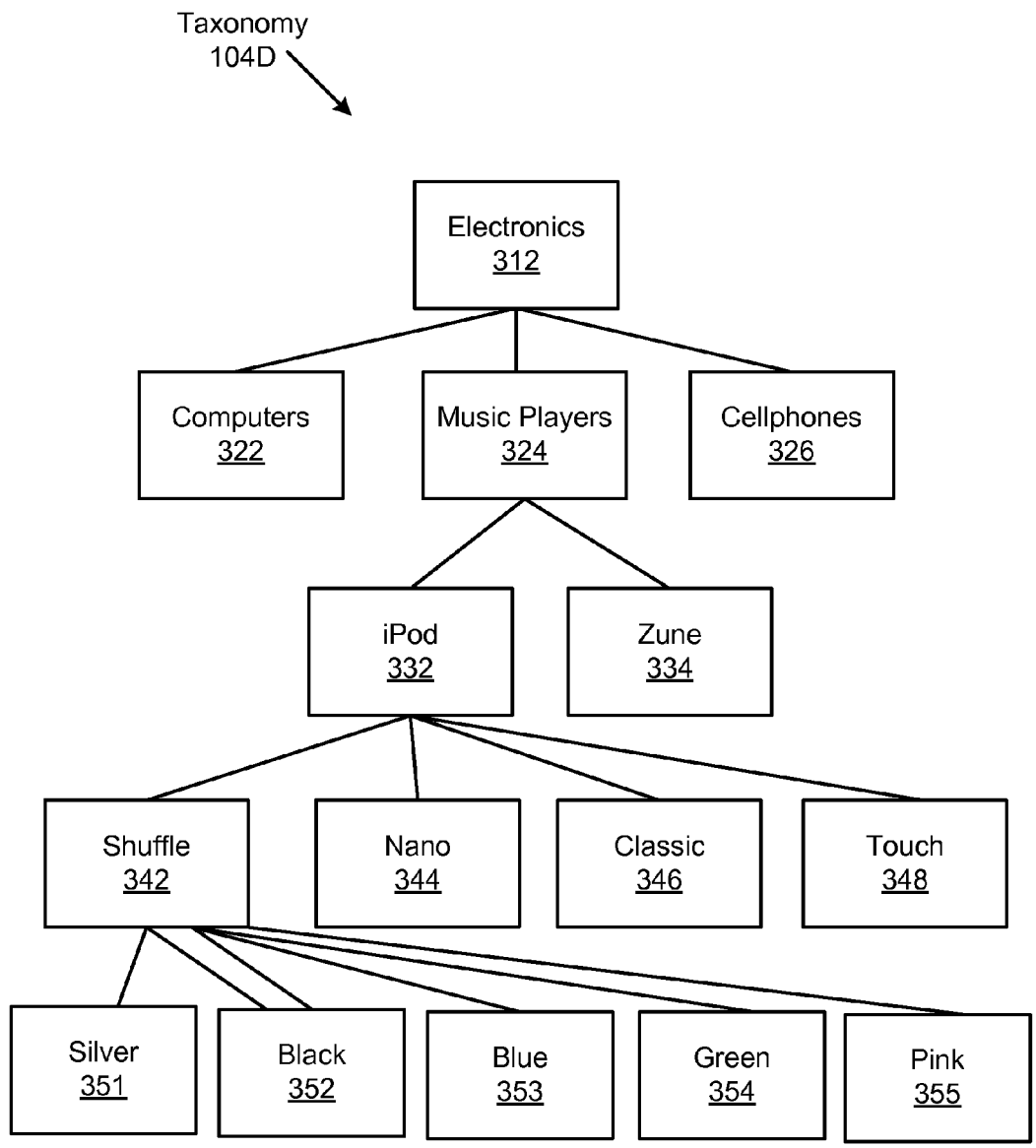
FIG. 3 is an exemplary block diagram of a taxonomy for electronics according to an example implementation.

An example illustrates how the system 100 may update a taxonomy 104 for electronics. FIG. 3 is an exemplary block diagram of a taxonomy 104D for electronics. In this example, the taxonomy 104D includes a category electronics 312. In this example, the category electronics 312 has, as subcategories, the category computers 322, the category music players 324, and the category cell phones 326. Subcategories for the categories computers 322 and cell phones 326 are not shown in FIG. 3. In this example, the category music players 324 may include subcategories iPod 332 and Zune 334. Also in this example, the category iPod 332 may include subcategories Shuffle 342, Nano 344, Classic 346 and Touch 348. The category shuffle 342 may include, as subcategories, categories Silver 351, Black 352, Blue 353, Green 354 and Pink 355.

This taxonomy 104D may have been previously known and stored in the taxonomies 104. However, the system 100 may crawl a website and/or multiple websites or webpages to determine whether to update the taxonomy 104D. In an example implementation, the crawler 112 may crawl an Apple® website such as the store.apple.com website shown in FIG. 4.

Figure 4:
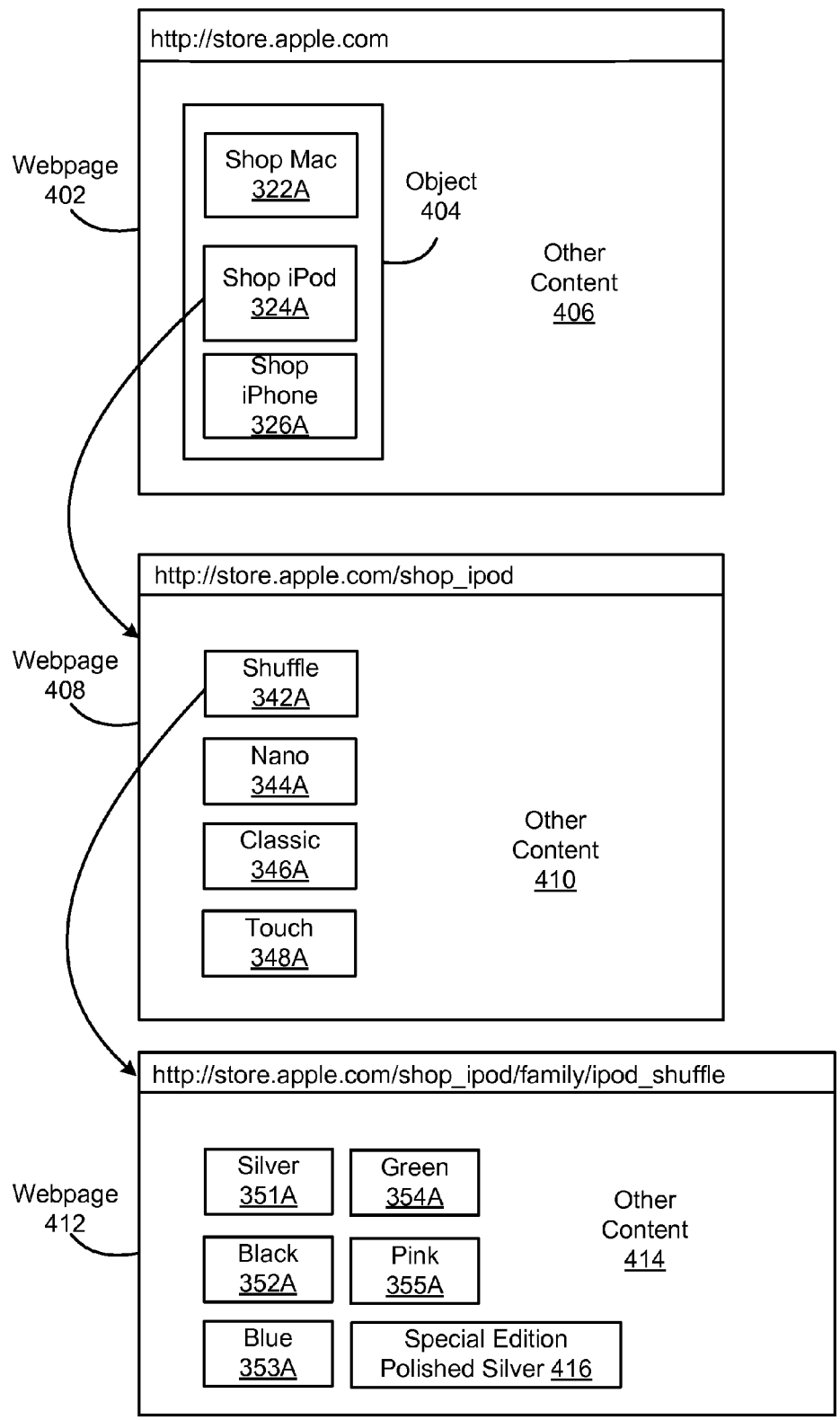
FIG. 4 is an exemplary block diagram of linked webpages from a single website according to an example implementation.

FIG. 4 is an exemplary block diagram of linked webpages from a single website according to an example implementation. In this example, the webpage 402 may be a page from an Apple website which shows categories of electronics sold by Apple, such as computers 322, music players 324 and cellphones 326. In an example implementation, the categories 322, 324, 326 may be presented on the webpage 402 as hyperlinked text, such as, "Shop Mac" 322A, "Shop iPod" 324A, and, "Shop iPhone" 326A. The hyperlinked text 322A, 324A, 326A corresponding to the categories 322, 324, and 326 may constitute structured HTML content, such as by being included in an HTML object 404 such as a div. Each of the hyperlinked texts 322A, 324A, 326A may link to other pages on the Apple website which present, describe, advertise, and/or offer for sale the categorized items and/or subcategories thereof. The webpage 402 also may include other content 406 which is not extracted by the taxonomy extractor 118 when updating the taxonomy 104D for electronics. The other content 406 may include graphic displays or other content related to items which may or may not fit into the electronics taxonomy 104D. The category rules may dictate that each of the hyperlinked texts 322A, 324A, 326A is associated with a subcategory of the electronics category 312 in the electronics taxonomy 104D, according to an example implementation.

The content extractor 120 may have been programmed to extract content from this webpage 402. The content extractor 120 may be programmed to check the div or other object 404 which includes the hyperlinks Shop Mac 322A, which includes the category of computers 322, Shop iPod 324A, which includes a category of music players 324, and Shop iPhone 326A, which includes items in the category cell phones 326, in accordance with, or as a result of, the category rules.

In the example shown in FIG. 4, the crawler 112 may proceed to the webpage 408 linked from "Shop iPod" 324A, which corresponds to the category music players 324, for subcategories of music players. The crawler 112 also may extract the hyperlinks for "Shop Mac" 322A, which corresponds to the category computers 322, and, "Shop iPhone" 326A, which corresponds to the cell phones 326.

The inclusion of these three hyperlinks 322A, 324A, 326A within the div and/or object 404 on the webpage 402 may be provided to the taxonomy extractor 118. The taxonomy extractor 118, in accordance with or as a result of the category rules, may pull the three hyperlinks 322A, 324A, 326A and find that they correspond to the previously known categories of computers 322, music players 324, and cell phones 326, respectively, and determine that the Apple website does not show a new subcategory of electronics 312.

Proceeding to a webpage 408 linked to by "Shop iPod" 324A, the crawler 112 may pull content from the webpage 408 with subcategories of music players 324 and/or iPods 332. The category rules may dictate that hyperlinks on the webpage 408 are associated with subcategories of the category iPod 332 included in the electronics taxonomy 104D. In this example, the webpage 408 includes hyperlinks associated with graphics objects labeled, "Shuffle" 342A, "Nano" 344A, "Classic" 346A, and "Touch" 348A, which may correspond to the categories Shuffle 342, Nano 344, Classic 346, and Touch 348, for example.

The crawler 112 may provide the content from this webpage 408 to the crawled content 109, which may in turn provide the content to the taxonomy extractor 118 which may, according to the category rules 122, determine that the hyperlinks Shuffle 342A, Nano 344A, Classic 346A and Touch 348A correspond to the previously known categories Shuffle 342, Nano 344, Classic 346 and Touch 348. Based on the hyperlinks for the Shuffle 342A, Nano 344A, Classic 346A and Touch 348A corresponding to the previously known categories Shuffle 342, Nano 344, Classic 346 and Touch 348 of the taxonomy 104C shown in FIG. 3, the taxonomy extractor 118 and/or comparator 124 may determine that the webpage 408 does not show any new subcategories of iPods 332, and/or may simply determine that a recent taxonomy 126 includes the categories Shuffle 342, Nano 344, Classic 346 and Touch 348 as subcategories of iPod 332. The webpage 408 also may include other content 410 which is not extracted by the taxonomy extractor 118 when updating the taxonomy 104D for electronics. The other content 410 may include graphic displays or other content related to items which may or may not fit into the electronics taxonomy 104D.

In an example implementation, the crawler 112 may proceed to a webpage 412 linked to by the Shuffle 342A. The crawler 112 may thereby proceed to the webpage 412 with subcategories of Shuffle 342. The category rules 122 may dictate that graphics objects on the webpage 412 are associated with subcategories of the category shuffle 342 included in the electronics taxonomy 104D. In this example, the webpage 412 may include six graphics objects of Shuffles 351A, 352A, 353A, 354A, 355A, and 416. The webpage 412 also may include other content 414 which is not extracted by the taxonomy extractor 118 when updating the taxonomy 104D for electronics. The other content 414 may include graphic displays or other content related to items which may or may not fit into the electronics taxonomy 104D.

The six graphics objects of the Shuffles 351A, 352A, 353A, 354A, 355A, and 416 included on the webpage 412 may include tool tips and/or displays which display the cursor is hovered over the particular Shuffle 351A, 352A, 353A, 354A, 355A, and 416. In this example, the tool tips associated with the Shuffles 351A, 352A, 353A, 354A, 355A, 416 display, "Silver," "Black," "Blue," "Green," "Pink," and "Special Edition Polished Silver," respectively.

The crawler 112 may provide this tooltip content to the crawled content 109, which may in turn provide this tooltip content to the taxonomy extractor 118. The taxonomy extractor 118 may, for example, utilize the text in the tooltip (or HTML content which creates the tooltip) to determine the categories associated with the objects 351A, 352A, 353A, 354A, 355A, and 416. The taxonomy extractor 118, according to the category rules 122 for the taxonomy 104D for electronics and according to the rules for the webpage 412 showing subcategories of the iPod Shuffle 342, may determine that the webpage 412 shows six subcategories of the iPod Shuffles 342, namely a subcategory Silver 351, a subcategory Black 352, a subcategory Blue 353, a subcategory Green 354, a subcategory Pink 355, and a subcategory Special Edition Polished Silver, which was not included in the stored taxonomy 104D. The taxonomy extractor 118 and/or comparator 124 may determine that the first five subcategories of iPod Shuffle category 342 shown on the webpage 418, namely Silver 351, Black 352, Blue 353, Green 354, and Pink 355 correspond to previously known categories in the taxonomy 104D, namely Silver 351, Black 352, Blue 353, Green 354, and Pink 355, respectively. However, the taxonomy extractor 118 also may recognize the new subcategory of iPod Shuffle 342, namely the Special Edition Polished Silver Shuffle. Or, the taxonomy extractor 118 may simply determine that the recent taxonomy includes Silver, Black, Blue, Green, Pink, and Special Edition Polished Silver as subcategories of the category Shuffle 342.

The taxonomy extractor 118 may provide the new or recent taxonomy 126 to a comparator 124. The comparator 124 may compare the taxonomy determined by the taxonomy extractor 118 to the stored electronics taxonomy 104D. The comparator 124 may retrieve the stored electronics taxonomy 104D from the taxonomies 104 stored in the database 102. The comparator 124 may receive the recent taxonomy 126 from the taxonomy extractor 118. The stored electronics taxonomy 104D may include the previously known subcategories of the Shuffle 342, namely, Silver 351, Black 352, Blue 353, Green 354, Pink 355. The recent taxonomy 126 may include six categories of the shuffle 342, namely, Silver, Black, Blue, Green, Pink 355, and Special Edition Polished Silver. The comparator 124 may compare the stored electronics taxonomy 104D to the recent taxonomy 126. The comparison of the stored electronics taxonomy 104D and the recent taxonomy 126 may show the new subcategory of Shuffle 342, the Special Edition Polished Silver.

The system 100 may determine that Special Edition Polished Silver should become a new category 128, a subcategory of Shuffle 342. The system 100 may make the new category 128 part of the taxonomy 104D for electronics which are stored in the taxonomies 104. The system 100 may automatically add the new category 128 as part of the taxonomy for electronics 104D stored in the taxonomies 104 and/or may provide the new category 128 to an administrator for approval as a new category. The system 100 may include the new category 128 in the electronics taxonomy 104D and/or provide the new category 128 to the administrator for approval based on the system 100 finding the new category 128 on a single webpage such as the iPod shuffle webpage 412, or may include the new category 128 in the electronics taxonomy 104D only after finding the new category 128 on at least two (or other threshold number of) webpages on distinct websites. In an example implementation, the system 100 may add the Special Edition Polished Silver graphic 416 as an example of the new category 128 called "Special Edition Polished Silver."

In an example implementation, the system 100, and/or another computing system, may, by using the classifier 110 or another classifier, classify other webpages and/or other data files which refer to the Special Edition Polished Silver iPod Shuffle, as part of the new category 128. The other webpages and/or other data files may be classified as part of the new category 128 based on their text including "Special Edition Polished Silver," and/or based on data included in the webpages and/or data being similar to the Special Edition Polished Silver graphic 416, according to example implementations.

Figure 5:
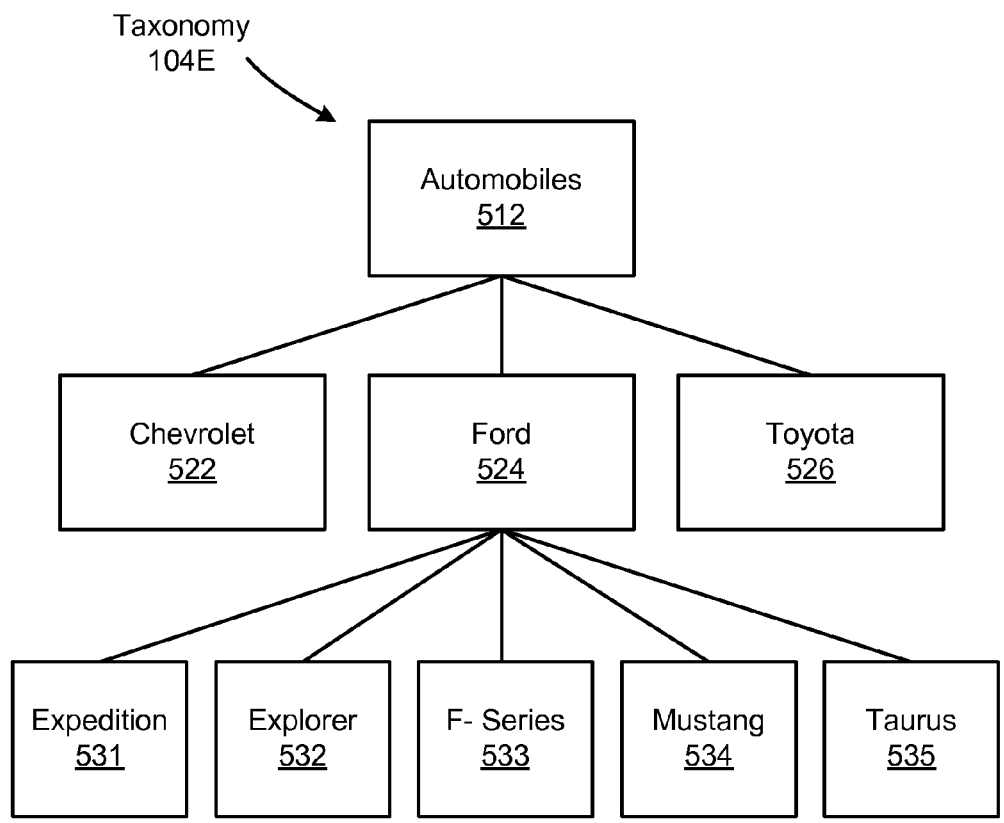
FIG. 5 is an exemplary block diagram of a taxonomy for automobiles according to an example implementation.

Another example of updating a taxonomy will be described with reference to automobiles. Referring to FIG. 5, an exemplary block diagram of an automobile taxonomy 104E is illustrated. The automobile taxonomy 104E may be included in the taxonomies 104 which are stored in the database 102 shown in FIG. 1. In this example, the taxonomy 104E may include the category automobiles 512. The category automobiles 512 may include subcategories Chevrolet 522, Ford 524, and Toyota 526. Other examples of subcategories of the category automobiles 512 may be included, which are not shown.

In the example shown in FIG. 5, category Ford 524 may include subcategories Expedition 531, Explorer 532, F-Series 533, Mustang 534, and Taurus 535. Other subcategories of the category Ford 524, which are not shown, also may be included in the taxonomy 104E.

Figure 6:
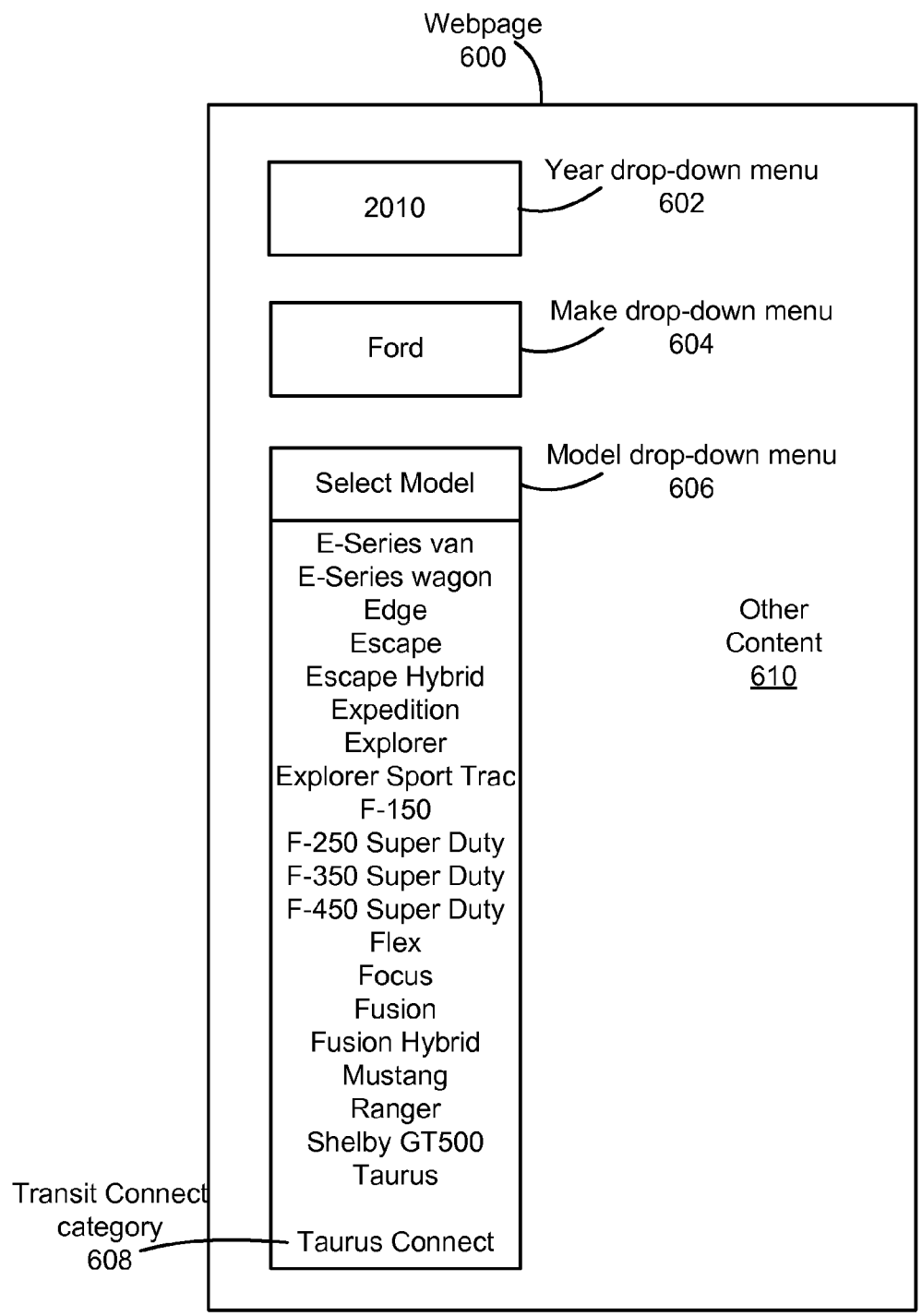
FIG. 6 is an exemplary block diagram of a webpage according to an example implementation.

In an example implementation, the system 100 may update the taxonomy 104E based on an automobile review website. Referring also to FIG. 6, an exemplary webpage 600 with subcategories of the automobiles category 512 is illustrated, according to an example implementation. In this example, the webpage 600 is a webpage of a website edmunds.com.

In this example, the webpage 600 includes drop down menus. The drop-down menus in the webpage 600 shown in FIG. 6 include a year drop-down menu 602. The year drop-down menu 602 allows a visitor to the webpage 600 to select a vehicle model year for automobiles for which the visitor wishes to view or review.

After the visitor has selected a vehicle model year from the year drop down menu 602, the visitor may select a vehicle make or manufacture from a make drop-down menu 604. The vehicle makes available are dependent upon the selection in the year drop-down menu 602. Certain manufacturers may have gone out of business and/or manufactured automobiles in particular years, and thus, the makes available may be dependent on the selected year.

After the visitor has selected the vehicle make from the make drop-down menu 604, the visitor may select a vehicle model from the model drop-down menu 606. The models available in the model drop-down menu 606 may depend on the selection made in the make drop-down menu 604 and the year drop-down menu 602. Manufacturers sometimes make different models in different years; thus, the model drop-down menu 606 shows only the models manufactured by the selected manufacturer in the selected year. While in the webpage 600, make is a subcategory of model year, the taxonomy 104E may not use the same taxonomical structure, and the system 100 may update portions of the taxonomy 104E based on the webpage 600 despite differences in the taxonomical hierarchy between the taxonomy 104E and the webpage 600. The category rules may dictate that manufacturers included in the make drop-down menu 604 are manufacturers which should be included in the automobile taxonomy 104E as subcategories of automobiles 512, and that models included in the model drop-down menu 606 are models which should be included in the automobile taxonomy 104E as subcategories of the manufacturer selected in the make drop-down menu 604, according to an example implementation.

In the example shown in FIG. 6, the crawler 112 may provide content to the crawled content 109 portion of the database 102, which may in turn provide the content to the taxonomy extractor 118 based on selecting the model year 2010 for the year drop-down menu 602, and selecting the manufacturer Ford for the make drop-down menu 604. In this example, the model drop-down menu 606 shows multiple models available, which were manufactured by Ford in the year 2010, such as an E-Series Van, and E-Series Wagon, Edge, Escape, Escape Hybrid, Expedition, Explorer, Explorer Sport Trac, F-150, F-250 Super Duty, F-350 Super Duty, F-450 Super Duty, Flex, Focus, Fusion, Fusion Hybrid, Mustang, Ranger, Shelby GT500, Taurus, and Transit Connect. In an example implementation, many of these models may have been included in the previously known taxonomy 104E; however, in this example, the Transit Connect category 608 may not have been included in the subcategories of the category Ford 524 for the taxonomy 104E.

The taxonomy extractor 118 may include all of the models included in the model drop-down menu 606, namely, the E-Series van, E-Series wagon, Edge, Escape, Escape Hybrid, Expedition, Explorer, Explorer Sport Trac, F-150, F-250 Super Duty, F-350 Super Duty, F-450 Super Duty, Flex, Focus, Fusion, Fusion Hybrid, Mustang, Ranger, Shelby GT500, Taurus, and Transit Connect, as subcategories of the category Ford 524 in the taxonomy 104E. The taxonomy extractor 118 may provide this determined taxonomy to the comparator 124.

The comparator 124 may retrieve the stored automobile taxonomy 104E from the taxonomy 104 stored in the database 102. The stored automobile taxonomy 104E may not include the Transit Connect model category 608; however, the recent taxonomy 126 may include the Transit Connect category 608. The comparator 124 may determine that the Transit Connect category 608 is a new category 128 and/or new model of car based on the Transit Connect category 608 being included in the recent taxonomy 126 but not the stored automobile taxonomy 104E. In an example implementation, the webpage 600 may link to another webpage based on the selection of the Transit Connect category 608 in the model drop-down menu 606. In this example, the system 100 may add the linked webpage (or content included therein) to the classifier model 106 as an example of the new Transit Connect category 608, which may be a subcategory of Ford 524.

Based on the comparator 124 determining that the Transit Connect category 608 is a new category 128, the system 100 may update the taxonomy 104E to include the Transit Connect 608 and thereby update the taxonomies 104 and/or may provide the Transit Connect category 608 to an administrator for approval as a new category 128. The system 100 may also check other websites, such as a Ford website, to determine whether the other websites include the Transit Connect category 608 as a subcategory of Ford 524, for greater reliability.

The text, "Transit Connect," and/or content on a webpage linked from the selection of the Transit Connect category 608, may be added to the classifier models 106 stored in the database 104 as an example(s) of the Transit Connect category 608. The example(s) may be used by the classifier 110, and/or a classifier of another computing system, to classify new webpages and/or files as members of the Transit Connect category 608 within the automobile taxonomy 104E. The automobile taxonomy 104E may, for example, be used to assist website visitors to find examples of desired automobiles. For example, visitors to a video sharing website, such as YouTube®, may select a category "Automobiles," and navigate through the automobile taxonomy 104E to find videos of their desired model of automobile. After the system 100 has updated the automobile taxonomy 104E to include the Transit Connect category 608, and classifier 110 has added videos to the Transit Connect category 608, YouTube visitors may watch videos showing the Transit Connect vehicle. The YouTube website may, for example, present advertisements to watchers of Transit Connect vehicles. The advertisements may be based on the supercategory(ies) of the Transit Connect, such as the manufacturer category Ford 524, and/or based on the category Automobiles 512, according to example implementations.

The system 100 may also remove obsolete categories. For example, if the model drop-down menu 606 indicates that certain models of cars are no longer manufactured, the system 100 may remove that model from the taxonomy 104E. The system 100 may, for example, remove obsolete categories, or those which are no longer frequently viewed, or which do not appear in taxonomies extracted from webpages, from the taxonomies 104, according to an example implementation. This removal of obsolete categories may be in accordance with the category rules dictating that certain categories should be found on certain webpages, and the content associated with the obsolete categories no longer being present on the webpages, according to an example implementation.

In an example implementation, the system 100, and/or any computing system, may store data files based on the taxonomies 104, which may be updated based on the recent taxonomy 126. The computing system may, for example, generate pointers, indexes, or keys for accessing the data files based on the taxonomies 104. For example, the keys may indicate files which are included in a given category, a category for a given file, and/or files which are included in subcategories and/or supercategories of a category or another file. Data files may, for example, be classified, indexed, and/or keyed in categories based on the taxonomies 104. The computer system may use the classification, indexes, and/or keys to access the files based on the categories.

The computer system also may select data files from the crawled websites 116A and/or 116B and add the data files to training sets. The computer system may compare files to the files in the training set to index and/or classify the files to categories within the stored taxonomy 104.

The computer system also may present advertisements to a user based on the taxonomies 104. For example, if a user provides search terms corresponding to or similar to a new category 128 to the computer system, the computer system may present advertisement(s) to the user based on the supercategory of the new category 128. The computer system may, for example, receive the search terms, perform a search for websites or webpages based on the received search terms, present search results to the user based on the search, and, in conjunction with presenting the search results, present the advertisement(s) to the user based on the supercategory, according to an example implementation.

The computer system may also present data, files, or content to a user, such as a web surfer, based on the taxonomies. For example, the computer system may classify videos or other content based on the taxonomies. The computer system may present the categories to the user, allowing the user to navigate through the taxonomy(ies) until the user has found videos or other content that the user wishes to download.

In an example implementation, the classifier 110 may automatically classify new content, such as videos to categories within the taxonomies 104. For example, the classifier 110 may classify videos as they are uploaded to YouTube. The classifier 110 may classify the content such as videos to the new category 128 or to pre-existing categories based on the classifier models 106 which were previously stored in the database 102, and/or based on the example files added to the classifier models 106 upon addition of the new category 128 to the taxonomies 104. The system 100 and/or other computer system may thereby update the taxonomies 104 and associated classifier models 106 as websites 116A, 116B reflect new categories 128 and associated content, and classify uploaded content within the updated taxonomies 104. Thus, the system 100 and/or other computer system may present shared content to users or visitors to a file sharing website(s), and the shared content may be presented within a contemporary or updated taxonomy. The user or visitor may navigate within the contemporary or updated taxonomy to find files such as videos within a desired category.

Figure 7:
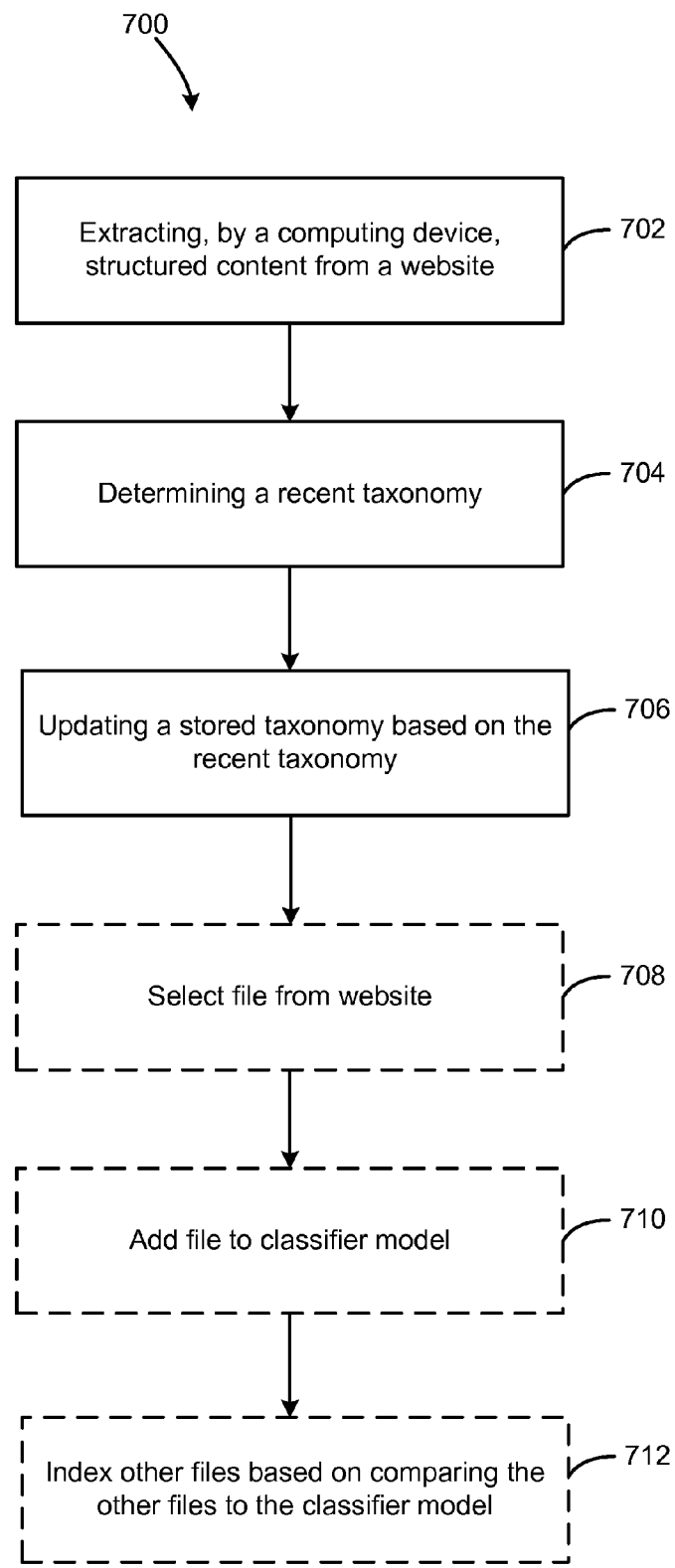
FIG. 7 is an exemplary flowchart of a method according to an example implementation of the system of FIG. 1.

FIG. 7 is a flowchart of an exemplary method 700 according to an example implementation. In this example, the method 700 may be implemented by a computer, such as the system 100. The method 700 may include extracting, by a crawler 112 and/or a taxonomy extractor 118, structured content from a website(s) 116A, 116B (702). The method 700 may also include determining, such as by the taxonomy extractor 118, a recent taxonomy 126 by applying category rules 122 to the structured content, the recent taxonomy 126 including multiple categories and a new category 128 (704). The method 700 may also include updating, such as by a comparator 124 and/or database 102, a stored taxonomy 104 based on the determined recent taxonomy 126 by adding the new category 128 to the stored taxonomy 104 (706).

In an example implementation, the extracting structured content (702) may include extracting structured content from multiple websites 116A, 116B.

In an example implementation, the extracting structured content (702) from the website 116A, 116B may include crawling the website(s) 116A, 116B.

In an example implementation, the extracting structured content (702) from the website(s) 116A, 116B may include periodically extracting structured content from the website(s) 116A, 116B.

In an example implementation, the extracting structured content (702) may include selecting keywords from the website(s) 116A, 116B.

In an example implementation, the determining the recent taxonomy (704) may include applying the category rules 122 to the structured content within the extracted data, the structured content including structured hypertext markup language (HTML) content.

In an example implementation, the extracting (702) may include extracting structured Hyper Text Markup Language (HTML) content from the website(s) 116A, 116B, and the determining the recent taxonomy (704) may include inferring at least the new category 128 by applying the category rules 122 to the structured HTML content.

In an example implementation, the structured content may include at least a first menu 604 and a second menu 606, contents of the second menu 606 depending on a selection from contents of the first menu 604, and the determining the recent taxonomy (704) may include determining the multiple categories and the new category 128 based on the contents of the first menu 604 and the contents of the second menu 606.

In an example implementation, the structured content may include a significant keyword for at least one of the multiple categories and the new category 128, and the determining the recent taxonomy (704) may include determining categories based on the significant keyword.

In an example implementation, the structured content may include a table and table entries within the table, and the determining the recent taxonomy (704) may include determining categories based on the table entries.

In an example implementation, the determining the recent taxonomy 126 (704) may include determining the recent taxonomy 126 based on the new category 128 not being included in the stored taxonomy 104B.

In an example implementation, the determining the recent taxonomy 126 (704) may include determining that the new category 128 is a subcategory of an existing category based on a location of a term associated with the new category 128 within the structured content.

In an example implementation, the determining the recent taxonomy 126 (704) may include determining that the new category 128 is a subcategory of an existing category based on comparing the data to previously stored and classified data, the previously stored and classified data being associated with the existing category.

In an example implementation, the updating the stored taxonomy 104B (706) may include adding the new category 128 based on the determined recent taxonomy 126.

In an example implementation, the updating the stored taxonomy 104B (706) may include naming the new category 128 based on at least a portion of the data from the website(s) 116A, 116B.

In an example implementation, the method 700 may further include storing data files based on the updated stored taxonomy 104.

In an example implementation, the method 700 may further include generating a key for accessing the data files based on the updated stored taxonomy 104.

In an example implementation, the method 700 may further include selecting at least one file from the website(s) 116A, 116B based on the category rules 122, the at least one file representing an example of a category, such as the new category 128, within the updated stored taxonomy 104 (708), adding the at least one file to a training set or classifier model 106 for the category (710), and indexing other files within the updated stored taxonomy 104 based on comparing the other files to the files within the training set or classifier model 106 (712).

In an example implementation, the method 700 may further include presenting advertisements to a user based on the updated stored taxonomy 104.

In an example implementation, the method 700 may further include comparing the recent taxonomy 126 to the stored taxonomy 104B, and presenting a candidate category, such as the new category 128, to an administrator based on the recent taxonomy 126 including the candidate category (such as the new category 128) and the stored taxonomy 104B not including the candidate category (such as the new category 128), wherein the updating the stored taxonomy 104B comprises updating the stored taxonomy 104B in response to the administrator accepting the candidate category.

Figure 8:
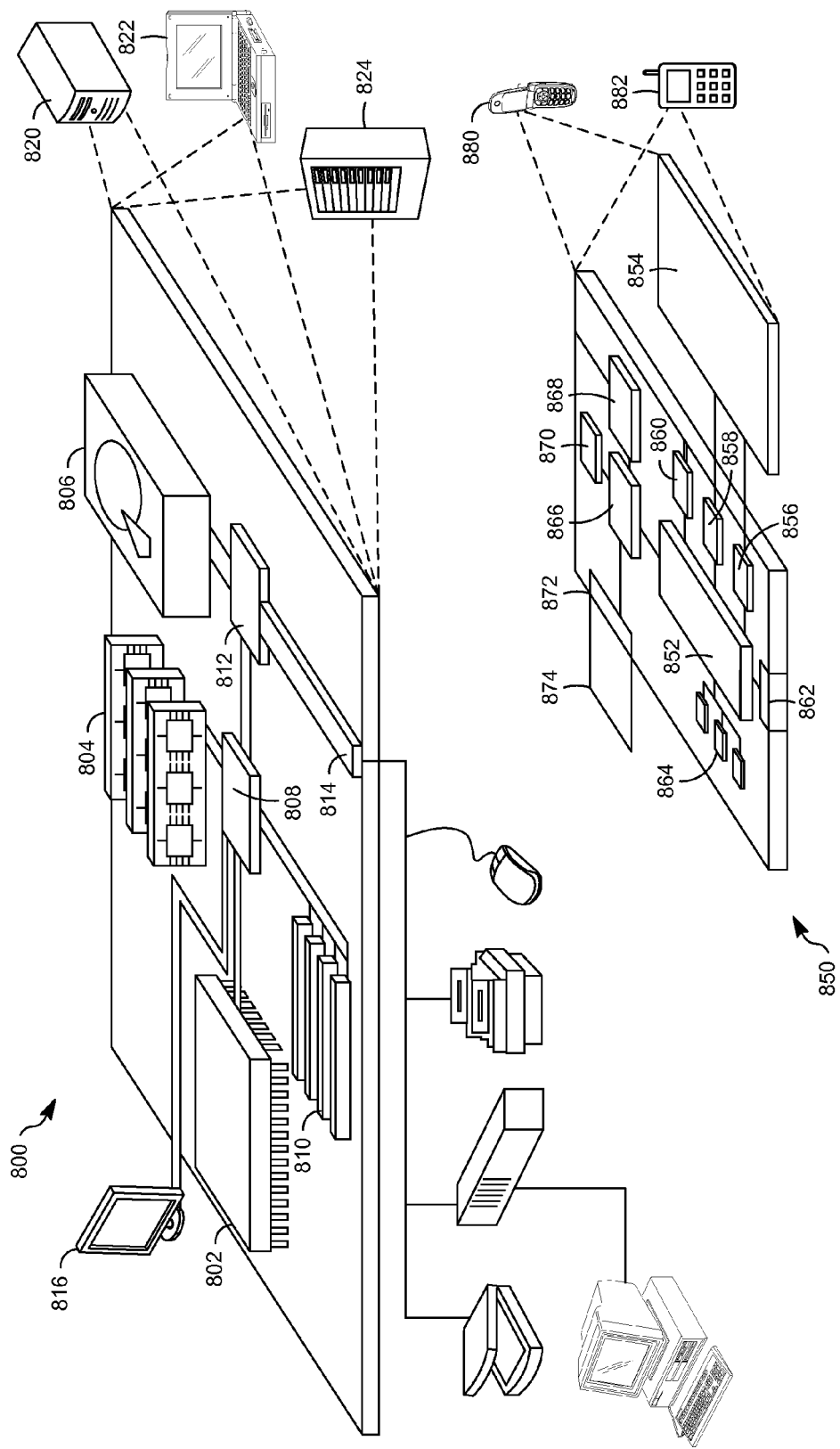
FIG. 8 is a block diagram showing example or representative computing devices and associated elements that may be used to implement the systems and methods of FIGS. 1-7.

FIG. 8 is a block diagram showing example or representative computing devices and associated elements that may be used to implement the systems of FIG. 1.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning system) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a non-transitory memory, such as a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile and/or non-transitory memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
    extracting, by a computing device, structured content from a website associated with a stored taxonomy, the structured content including at least a first menu and a second menu, contents of the second menu depending on a selection from contents of the first menu;
    determining a recent taxonomy by applying category rules to the structured content, the category rules being customized for a structure of a page of the website including the first menu and the second menu, the category rules dictating that contents of the second menu represent subcategories of at least one known category represented by contents of the first menu, the recent taxonomy including multiple known subcategories of the known category and a new subcategory represented by a new item on the second menu; and
    updating the stored taxonomy based on the determined recent taxonomy by adding the new subcategory to the stored taxonomy.

2. The method of claim 1, wherein the stored taxonomy did not include the new subcategory before the updating.

3. The method of claim 1, wherein the extracting structured content from the website comprises crawling the website.

4. The method of claim 1, wherein the extracting structured content from the website comprises periodically extracting structured content from the website.

5. The method of claim 1, wherein the determining the recent taxonomy comprises applying the category rules to the structured content, the structured content including structured HyperText Markup Language (HTML) content.

6. The method of claim 1, wherein:
    the extracting includes extracting structured HyperText Markup Language (HTML) content from the website; and
    the determining the recent taxonomy comprises inferring at least the new subcategory by applying the category rules to the structured HTML content.

7. The method of claim 1, wherein:
    the structured content includes significant keywords for at least one of the multiple known subcategories and the new subcategory, and
    the determining the recent taxonomy comprises determining categories and/or subcategories based on the category rules dictating that at least some of the significant keywords correspond to categories and/or subcategories.

8. The method of claim 1, wherein the category rules are customized based on the stored taxonomy and a stored version of the website.

9. The method of claim 1, further comprising storing data files based on the updated stored taxonomy.

10. The method of claim 1, further comprising generating a key for accessing data files based on the updated stored taxonomy.

11. The method of claim 1, further comprising presenting advertisements to a user based on the updated stored taxonomy.

12. The method of claim 1, further comprising:
    maintaining a first index of websites to crawl for a first stored taxonomy; and
    maintaining a second index of websites to crawl for a second stored taxonomy,
    wherein the extracting comprises:
        extracting structured content from websites identified by the first index; and
        extracting structured content from websites identified by the second index;
    wherein the determining comprises:
        determining a first recent taxonomy by applying first category rules to the structured content from the websites identified by the first index, the first category rules being customized for a structure of at least one page from the websites identified by the first index, the first recent taxonomy including multiple known subcategories associated with the first stored taxonomy and the new subcategory; and determining a second recent taxonomy by applying second category rules to the structured content from the websites identified by the second index, the second category rules being customized for a structure of at least one page from the websites identified by the second index, the second recent taxonomy including only multiple known categories and/or categories associated with the second stored taxonomy;

wherein the updating includes updating the stored first taxonomy based on the determined recent taxonomy by adding the new subcategory to the stored second taxonomy.

13. The method of claim 1, further comprising:

maintaining a first index of websites to crawl for a first stored taxonomy; and maintaining a second index of websites to crawl for a second stored taxonomy, wherein the extracting comprises:

extracting structured content from websites identified by the first index; and extracting structured content from websites identified by the second index;

wherein the determining comprises:

determining a first recent taxonomy by applying first category rules to the structured content from the websites identified by the first index, the first category rules being customized to:

associate each hyperlinked text within an object on a first page within the identified websites with a category associated with the first stored taxonomy; and associate each tooltip on a second page within the identified websites with a category, the tooltips on the second page within the identified websites including multiple known subcategories associated with the first stored taxonomy and the new subcategory; and determining a second recent taxonomy by applying second category rules to the structured content from the websites identified by the second index, the second category rules being customized to associate each selection from a drop-down menu on a first page within the identified websites with a category associated with the second stored taxonomy;

wherein the updating includes updating the stored first taxonomy based on the determined recent taxonomy by adding the new subcategory to the stored second taxonomy.

14. The method of claim 13, further comprising removing at least one subcategory from the stored second taxonomy based on a selection associated with the at least one subcategory not being included in the drop-down menu.

15. The method of claim 1, further comprising removing at least one subcategory from the stored taxonomy based on a selection associated with the at least one subcategory not being included in the page of the website.

16. The method of claim 1, wherein all of the items within the second menu are subcategories of the known category.

17. A method comprising:

extracting, by a computing device, structured content from a website associated with a stored taxonomy, the structured content of the website including a table and table entries within the table;

determining a recent taxonomy by applying category rules to the structured content, the recent taxonomy including multiple known subcategories of a known category and a new subcategory of the known category, the category rules being customized for the structure of the website to dictate that the table entries indicate subcategories of the known category and a table entry within the table must be the new subcategory; and updating the stored taxonomy based on the determined recent taxonomy by adding the new subcategory of the known category to the stored taxonomy.

18. The method of claim 17, wherein the determining the recent taxonomy includes determining the recent taxonomy based on the new subcategory not being included in the stored taxonomy.

19. The method of claim 17, wherein the determining the recent taxonomy includes determining that the new subcategory is a subcategory of the known category based on a location of a term associated with the new subcategory within the structured content.

20. The method of claim 17, wherein the determining the recent taxonomy includes determining that the new subcategory is a subcategory of the known category based on comparing data from the structured content to previously stored and classified data, the previously stored and classified data being associated with the known category.

21. The method of claim 17, further comprising:

comparing the recent taxonomy to the stored taxonomy; and presenting a candidate subcategory to an administrator based on the recent taxonomy including the candidate subcategory and the stored taxonomy not including the candidate subcategory, wherein the updating the stored taxonomy comprises updating the stored taxonomy in response to the administrator accepting the candidate subcategory.

22. The method of claim 21, wherein the extracting, determining, comparing, and presenting are performed automatically and without human intervention.

23. A non-transitory computer-readable medium including executable code tangibly embodied thereon, the executable code being configured to, when executed, cause a data processing apparatus to:

extract structured content from a website associated with a stored taxonomy, the structured content including at least a first menu and a second menu, contents of the second menu depending on a selection from contents of the second menu;

determine a recent taxonomy by applying category rules to the structured content, the category rules being customized for a structure of a page of the website including the first menu and the second menu, the category rules dictating that contents of the second menu represent subcategories of at least one known category represented by contents of the first menu, the recent taxonomy including multiple known subcategories of the known category and a new subcategory represented by a new item on the second menu; and update the stored taxonomy based on the determined recent taxonomy by adding the new subcategory to the stored taxonomy.

24. The non-transitory computer-readable storage medium of claim 23, wherein the stored taxonomy did not include the new category before the updating.

25. An apparatus comprising:
   at least one processor; and
   at least one memory device, the at least one memory device comprising executable code stored thereon that, when executed by the at least one processor, is configured to cause the apparatus to:
      extract structured content from a website associated with a stored taxonomy, the structured content including at least a first menu and a second menu, contents of the second menu depending on a selection from contents of the first menu;
      determine a recent taxonomy by applying category rules to the structured content, the category rules being customized for a structure of a page of the website including the first menu and the second menu, the category rules dictating that contents of the second menu represent subcategories of at least one known category represented by contents of the first menu, the recent taxonomy including multiple known subcategories of the known category and a new subcategory represented by a new item on the second menu; and
      update the stored taxonomy based on the determined recent taxonomy by adding the new subcategory to the stored taxonomy.

26. The apparatus of claim 25, wherein the stored taxonomy did not include the new category before the updating.

* * * * *